United States Patent
Yamamoto et al.

(10) Patent No.: US 6,489,877 B1
(45) Date of Patent: Dec. 3, 2002

(54) CERAMIC INDUCTOR COMPONENT AND COMPOSITE COMPONENT USING SAME

(75) Inventors: Takahiro Yamamoto, Omihachiman (JP); Tadashi Morimoto, Hikone (JP); Kuniaki Fujimoto, Shiga-ken (JP)

(73) Assignee: Murata Manufacturing Co. Ltd. (JP)

( * ) Notice: Subject to any disclaimer, the term of this patent is extended or adjusted under 35 U.S.C. 154(b) by 183 days.

(21) Appl. No.: 09/711,642

(22) Filed: Nov. 13, 2000

(30) Foreign Application Priority Data

Nov. 11, 1999 (JP) ............................................. 11-320856

(51) Int. Cl.[7] ................................................. H01F 5/00
(52) U.S. Cl. ...................... 336/200; 336/232; 336/223; 336/83
(58) Field of Search ........................ 336/83, 192, 200, 336/221, 232, 233, 223

(56) References Cited

U.S. PATENT DOCUMENTS 6,189,200 B1 * 2/2001 Takeuchi et al. ......... 156/89.12
6,304,164 B1 * 10/2001 Ohno et al. ................ 29/602.1

* cited by examiner

Primary Examiner—Lincoln Donovan
Assistant Examiner—Jennifer A Poker
(74) Attorney, Agent, or Firm—Dickstein, Shapiro, Morin & Oshinsky, LLP

(57) ABSTRACT

A ceramic inductor component and a composite component are provided having desired properties, superior stability of properties and superior durability. When Ni—Cu—Zn ferrite or Ni—Cu ferrite is used for a magnetic ceramic body constituting an inductor portion, and when the contents of S, Cl and Na contained in the ferrite are set to be in the ranges of about 5 to 150 ppm, about 5 to 150 ppm and about 5 to 100 ppm, respectively, diffusion of an internal conductive metal primarily composed of Ag into the magnetic ceramic body is suppressed, and hence, the degradation of electric properties can be avoided. Accordingly, by facilitating sintering, the insulating resistance of the ceramic is improved, and the durability and reliability of the ceramic inductor component can be improved.

20 Claims, 2 Drawing Sheets

CERAMIC INDUCTOR COMPONENT AND COMPOSITE COMPONENT USING SAME

BACKGROUND OF THE INVENTION

1. Field of the Invention

The present invention relates to inductor components, and more particularly, relates to a ceramic inductor component having an inductor portion formed of a magnetic ceramic body by baking together with electrodes (electrode material) primarily composed of silver (Ag) and a composite component thereof.

2. Description of the Related Art

Recently, inductor components (ceramic inductor components) provided with magnetic ceramic bodies are widely used.

As an example of the ceramic inductor components mentioned above, there are laminated ceramic inductor components.

The laminated ceramic inductor components are generally produced by a step of forming electrodes used as internal conductors by screen printing or the like on magnetic green sheets containing ferrite or the like, a step of laminating, compressing, and baking the magnetic green sheets under predetermined conditions, and a subsequent step of forming external electrodes so as to be connected with the internal conductors. Accordingly, the laminated ceramic inductor components generally have conductors (for example, coil portions) disposed in ferrite-based ceramic magnetic bodies (chips) so as to form inductor portions.

In addition, ceramic inductor components other than the laminated inductor components as described above have, for example, coiled conductors provided on cores, which are formed by disposing and baking conductive materials on the cores composed of ferrite-based ceramics or the like.

When the ceramic inductor component as described above is produced, as a magnetic material used for a magnetic ceramic body, Ni—Cu—Zn (nickel-copper-zinconium) ferrite, Ni—Cu (nickel-copper) ferrite, Ni—Zn (nickel-zirconium) ferrite, or the like is generally used, which can be baked at a relatively low temperature. Such ferrite materials which can be baked at a relatively low temperature are used because an electrode material primarily composed of Ag having high electric conductivity is preferably baked at a low temperature. This electrode material is used for conductors constituting the inductors in order to improve electric properties of ceramic inductor components.

However, there is a problem in that products using Ni—Cu—Zn ferrite or Ni—Zn ferrite, as a magnetic material constituting ceramic inductors, tend to have considerable variations in the properties and in the proportion defective in manufacturing process, which are caused by small changes of parameters in the production process.

SUMMARY OF THE INVENTION

In order to overcome the problems described above, the present invention provides a ceramic inductor component and a composite component having desired properties, excellent stability, and excellent durability.

In order to clarify the reasons for the variations in properties of products and the defective proportion caused by small changes of parameters in manufacturing process for the ceramic inductors using Ni—Cu—Zn ferrite, Ni—Cu ferrite, or Ni—Zn ferrite, the inventors of the present invention conducted various experiments and research. As a result, the inventors discovered that when the sulfur (S), chlorine (Cl) and sodium (Na) are present in predetermined ranges in the ferrite material, the electric properties thereof, i.e., the inductance L and the Q value could be improved. In addition, they found the insulation resistance was increased, which is an index of reliability, and the high insulation resistance lasted over even long periods of time. Through even further intensive research by the inventors of the present invention, the present invention was made.

That is, a ceramic inductor component of the present invention comprises an inductor portion formed by baking a magnetic ceramic body and an electrode primarily composed of silver integrally; wherein the magnetic ceramic body includes one of Ni—Cu—Zn ferrite and Ni—Cu ferrite, and contents of sulfur, chlorine and sodium in the ferrite are in the range of about 5 to 150 ppm sulfur, about 5 to 150 ppm chlorine and about 5 to 100 ppm sodium.

When a magnetic ceramic body comprising Ni—Cu—Zn ferrite or Ni—Cu ferrite is used, and when the contents of S, Cl and Na in the ferrite are set to be in the ranges of about 5 to 150 ppm, about 5 to 150 ppm and about 5 to 100 ppm, respectively, a highly reliable ceramic inductor component can be obtained, which is reliably provided with necessary properties and with excellent stability.

The reason the contents of S, Cl and Na are set to be in the ranges described above is that when the content of S or Cl exceeds the range described above, diffusion of Ag contained in the electrode progresses into the magnetic ceramic body, whereby the inductance L and the Q value are significantly decreased, and when the content of S or Cl is below the range described above, the inductance L and the Q value are decreased. In addition, when the content of Na exceeds the range described above, the insulation resistance is decreased in a loading test, and when the content is below the range, the initial insulation resistance will not meet the specification value ($\log(IR) \geq 9$).

The contents of S, Cl and Na in the ferrite are more preferably in the ranges of about 40 to 120 ppm, about 10 to 50 ppm and about 10 to 20 ppm, respectively.

In this connection, S, Cl and Na in the ferrite can be measured using various known methods.

In the ferrite, S is present in the form of S, S compounds, $SO_4$ ions, and the like, Cl is present in the form of $FeCl_3$, $FeCl_2$, $NiCl_2$, and the like, and Na is present in the form of $Na_2S$, $Na_2SO_4$, $Na_2O$, $NaCl$, and the like, A ceramic inductor component of the present invention comprises an inductor portion formed by baking a magletticceraic body and an electrode (electrode material) primarily composed of silver integrally wherein the magnetic ceramic body comprises one of Ni—Cu—Zn ferrite and Ni—Cu ferrite, contents of sulfur, chlorine and sodium in the ferrite material before firing are in a range of about 10 to 600 ppm sulfur, about 10 to 600 ppm chlorine, and about 30 to 120 ppm sodium, and contents of sulfur, chlorine and sodium in the ferrite after firing are in a range of about 5 to 150 ppm sulfur, about 5 to 150 ppm chlorine, and about 5 to 100 ppm sodium.

The S, Cl and Na contained in the ferrite are evaporated to some extent in baking; however, when a ferrite before baking, i.e., starting materials for the ferrite, is used which contains S: about 10 to 600 ppm, Cl: about 10 to 600 ppm, and Na: about 30 to 120 ppm, the contents of S, Cl and Na in the ferrite contained in a magnetic ceramic body baked under general conditions can be controlled in the ranges of about 5 to 150 ppm, about 5 to 150 ppm, and about 5 to 100 ppm, respectively. Consequently, a superior ceramic inductor component can be obtained which is reliably provided with necessary properties and with superior reliability. Accordingly, the present invention can be effectively carried out.

The ceramic inductor component of the present invention described above is provided with a laminated coil provided in the magnetic ceramic body, as the inductor portion described above, in which electrode layers are laminated with each other with ceramic magnetic layers provided therebetween and are connected with each other.

In the present invention, the structure of the electrode (conductor) is not specifically limited. However, when the present invention is applied to a ceramic inductor component having a laminated coil, as an inductor portion, formed of magnetic ceramic layers and electrode layers laminated therewith, it is particularly effective, since improvements can be realized in the stability of properties and reliability of the ceramic inductor component (laminated inductor) having a laminated coil which is compact and can yield a large inductance, as an inductor portion.

A composite component of the present invention comprises an inductor portion formed of a magnetic ceramic body by baking together with electrodes (electrode material) primarily composed of Ag and at least another element integrated with the inductor portion, wherein the magnetic ceramic body comprises one of Ni—Cu—Zn ferrite and Ni—Cu ferrite, and the contents of sulfur, chlorine and sodium in the ferrite are in a range of about 5 to 150 ppm S, about 5 to 150 ppm Cl, and about 5 to 100 ppm Na.

In the composite component having an inductor portion, when Ni—Cu—Zn ferrite or Ni—Cu ferrite is also used a magnetic ceramic body constituting an inductor portion, and when the contents of S, Cl and Na in the ferrite are set to be in the ranges of about 5 to 150 ppm, about 5 to 150 ppm, and about 5 to 100 ppm, respectively, a highly reliable composite component can be obtained which is reliably provided with necessary properties and with superior stability.

The reason the contents of S, Cl and Na are set to be in the ranges described above is the same reasons as described in the case of the ceramic inductor component described above.

The contents of S, Cl and Na in the ferrite are more preferably in the ranges of about 40 to 120 ppm, about 10 to 50 ppm, and about 10 to 20 ppm, respectively.

In the present invention, at least another element integrated with the inductor portion is the broad concept including a capacitor portion, an inductor portion having properties which is different from the inductor portion described above, a resistor, a varistor, and the like.

A composite component of the present invention comprises an inductor portion formed of a magnetic ceramic body by baking together with electrodes (electrode material) primarily composed of silver, and at least another element integrated with the inductor portion, wherein the magnetic ceramic body comprises one of Ni—Cu—Zn ferrite and Ni—Cu ferrite, wherein contents of sulfur, chlorine and sodium in the ferrite material before firing are in a range of about 10 to 600 ppm sulfur, about 10 to 600 ppm chlorine, and about 30 to 120 ppm sodium, and contents of sulfur, chlorine and sodium in the ferrite after firing are in a range of about 5 to 150 ppm sulfur, about 5 to 150 ppm chlorine, and about 5 to 100 ppm sodium When a ferrite before baking, i.e., starting materials for the ferrite, is used which comprises about 10 to 600 ppm S, about 10 to 600 ppm Cl, and about 30 to 120 ppm Na, the contents of S, Cl and Na in the ferrite after baking contained in the magnetic ceramic body can be controlled in the ranges of about 5 to 150 ppm, about 5 to 150 ppm, and about 5 to 100 ppm, respectively. Consequently, a highly reliable ceramic inductor component can be obtained which is reliably provided with necessary properties and with stability. Accordingly, the present invention can be advantageously carried out.

The composite component of the present invention described above is provided with a laminated coil provided in the magnetic ceramic body, as the inductor portion, in which electrode layers are laminated with each other with ceramic magnetic layers provided therebetween and are connected with each other.

In the present invention, the structure of the electrodes (conductors) is not specifically limited. However, when the present invention is applied to a composite component using a laminated coil, as the inductor portion, formed of magnetic ceramic layers and electrode layers laminated therewith, it is particularly effective, since improvements can be realized in the stability of properties and reliability of the composite component having a laminated coil which is compact and which can yield a large inductance, as an inductor portion.

DESCRIPTION OF THE PREFERRED EMBODIMENTS

Figure 1A:
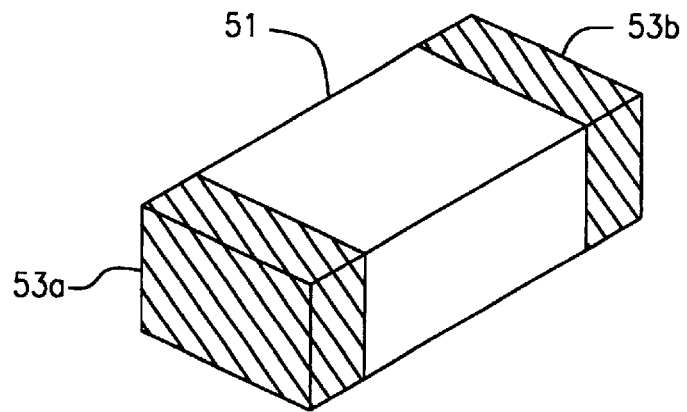
FIG. 1A is a perspective view of a ceramic inductor component according to an example of the present invention.

In a ceramic inductor component and a composite component according to the present invention, Ni—Cu—Zn ferrite or Ni—Cu ferrite can be used as a magnetic ceramic body, and in particular, Ni—Cu—Zn ferrite is preferably used.

In addition, the composition of Ni—Cu—Zn ferrite is not specifically limited, and various compositions may be selected in accordance with objects; however, for example, it is preferable that the content of Ni (NiO) be about 15 to 25 mol %, the content of Cu (CuO) be about 5 to 15 mol %, and the content of Zn (ZnO) be about 20 to 30 mol %.

The Ni—Cu—Zn ferrite may contain approximately 5 percent by weight or less of cobalt (Co), manganese (Mn), and the like. In addition, approximately 1 percent by weight or less of calcium (Ca), silicon (Si), bismuth (Bi), vanadium (V), lead (Pb), and the like may be present.

When Ni—Cu ferrite is used, various glasses, such as borosilicate glass, may be contained therein.

In the present invention, in view of obtaining a practical Q value as an inductor, a conductive material primarily composed of Ag having low resistance is preferably used as a material (electrode material) used for electrodes (conductors) constituting the inductor, and a conductive material composed of about 90 wt % Ag or greater is more preferably used. In particular, a conductive material composed of 99.9 wt % or greater of Ag is preferably used.

In this embodiment, the structure of the electrodes constituting the inductor portion is not specifically limited. A laminated coil and a coil conductor provided on a core may be used, and a conductor having no coil shape may also be used.

The conductive material forming external electrodes used for the ceramic inductor components and the composite components is not specifically limited, and for example, Ag, platinum (Pt), palladium (Pd), gold (Au), Cu, Ni, and an alloy containing at least one element mentioned above may be used. As a particularly preferable conductive material, there may be mentioned Ag, a Ag—Pd alloy, and the like.

The dimensions of the ceramic inductor component and the composite component of the present invention are not specifically limited, and dimensions may be optionally determined in accordance with the object and application of the ceramic inductor component.

When magnetic green sheets are formed, a slurry (ceramic slurry) composed of Ni—Cu—Zn ferrite is commonly used, and the ceramic slurry can be prepared by, for example, a method described below.

Powdered starting materials for the ferrite having S, Cl and Na in predetermined amounts defined in the present invention, for example, predetermined amounts of powdered NiO, CuO, ZnO and $Fe_2O_3$ and the like, are wet-mixed using a ball mill or the like. In this step, individual particle diameters of the starting materials are preferably in a range of about 0.1 to 10 $\mu$m.

The slurry obtained by wet mixing is dried using a spray drier or the like and is then calcined. In addition, the calcined mixture thus obtained is sufficiently wet-pulverized using a ball mill and is then dried by a spray drier.

The powdered ferrite thus formed is dispersed in a solvent so as to form a ceramic slurry, and the ceramic slurry was then formed into sheets, thereby yielding magnetic green sheets.

When necessary, various glasses and oxides may be added to the ceramic slurry.

As a conductive paste for forming the electrodes (conductor) and as a conductive paste for forming the external electrodes, materials may be used which is obtained by mixing the metals or the alloys described above, or various oxides, organic metal compounds, or resinates, which will form the conductive materials described above by baking, with various binders and solvents. Depending on situations, a commercially available material may be used in some cases.

The temperature for baking inductor elements or elements (non-baked laminate or the like) of composite components is preferably about 800 to 930° C., and more preferably, about 850 to 900° C.

The baking time is preferably about 0.05 to 5 hours, and more preferably, about 0.1 to 3 hours. In addition, baking is preferably perfonred in an atmosphere at a molar percentage of oxygen of 1 to 100% ($PO_2$=1–100%).

The temperature for baking the external electrodes is generally set to be about 500 to 700° C., and the baking time therefor is generally set to be approximately 10 minutes to 3 hours. In addition, the baking is generally performed in the air.

In the present invention, in and after baking, a heat treatment is preferably performed in an atmosphere containing oxygen at a higher concentration than in the air. The reason for this is that, by performing heat treatment in an atmosphere containing a higher concentration of oxygen, metals, such as Cu and Zn, and $Cu_2O$ and $Zn_2O$ having low resistance which are precipitated as oxides in the baking step described above, can be precipitated as oxides, such as CuO and ZnO, which have high resistance and which are harmless. In addition, the molar percentage of oxygen in an atmosphere for heat treatment is preferably in a range of about 20 to 100%. The reason for this is that when the molar percentage of oxygen is below about 20%, the ability to suppress the precipitation of Cu, Zn, $Cu_2O$, $Zn_2O$, and the like is decreased.

In addition, the molar percentage of oxygen is more preferably set to be about 50 to 100% and is most preferably set to be 100%.

Furthermore, the heat treatment described above is preferably performed at a last stage in baking or after. baking is completed.

EXAMPLES

Hereinafter, the present invention will be described with reference to examples, and the advantages thereof will be further described in detail.

In the examples, a-ceramic inductor component shown in FIGS. 1A and 1B will be described as an example, in which a laminated coil 52 (FIG. 1B) formed by connecting a plurality of internal conductors (coil pattern) 52a (FIG. 1B) is disposed in an element (chip element) 51 composed of a magnetic ceramic body, and external electrodes 53a and 53b (FIG. 1A) are formed at both ends of the element 51 so as to be connected with both ends of the coil 52.

Production of Ceramic Inductor Component

A method for producing the ceramic inductor component will first be described.

(1) Slurries (ceramic slurries) composed of Ni—Cu—Zn ferrite containing. various contents of S, Cl and Na as shown in Tables 1 to 5 were formed into sheets, and magnetic green sheets 54 were prepared by providing via holes 55 at predetermined locations.

(2) A conductive paste primarily composed of Ag for forming internal conductors (electrodes) was printed on the surfaces of the magnetic green sheets 54 by screen printing or the like, thereby forming the coil pattern (electrode pattern) 52a.

(3) Magnetic green sheets 54 having the coil patterns 52a formed thereon were laminated with each other, and magnetic green sheets (external sheets) 54a provided with no coil pattern thereon were disposed on the top and the bottom surfaces of the laminate thus formed and was then compressed. Accordingly, the individual coil patterns 52a were connected with each other by the via holes 55, thereby forming the laminated coil 52.

(4) Next, the laminate (non-baked element) having the coil 52 formed therein was baked at, for example, 900° C., thereby yielding the element (inductor element) 51 provided with the laminated coil 52 therein.

(5) Subsequently, a conductive paste was coated on both ends of the element 51 and baked, thereby forming the external electrodes 53a and 53b (FIG. 1A).

Accordingly, a ceramic inductor component was obtained which was provided with the laminated coil as an internal conductor in the magnetic ceramic body.

In the examples, the starting materials for the ferrite contain 10 to 600 ppm S, 10 to 600 ppm Cl, and 30 to 120 ppm Na so that the ferrite after baking contain S, Cl, and Na in the predetermined ranges defined by the present invention.

Property Evaluation

Electric properties, such as the inductance L, the Q value, and the initial insulation resistance, were measured for laminated ceramic inductor components produced by the steps (1) to (5) described above, and in addition, in order to evaluate the reliability, changes in insulation resistance in accelerated test were measured.

The results are shown in Tables 1 to 5.

In Tables 1 to 5, sample numbers marked with asterisks were comparative examples (conventional examples) which were outside the scope of the present invention.

TABLE 1

| Sample Number | Elements in ferrite (ppm) | | | Internal conductor | L ($\mu$H) | Q | Initial insulation resistance (LOGIR) | Reliability test |
|---|---|---|---|---|---|---|---|---|
| | S | Cl | Na | | | | | |
| 1* | 0 | 0 | 0 | ○ | 2.8 | 26 | <8 | Δ |
| 2* | 5 | 0 | 0 | ○ | 3.0 | 28 | <8 | Δ |
| 3* | 80 | 0 | 0 | ○ | 3.0 | 28 | <8 | Δ |
| 4* | 150 | 0 | 0 | ○ | 3.0 | 28 | <8 | Δ |
| 5* | 200 | 0 | 0 | Δ | 2.7 | 27 | <8 | Δ |
| 6* | 0 | 5 | 0 | ○ | 3.1 | 28 | <8 | Δ |
| 7* | 5 | 5 | 0 | ○ | 3.3 | 30 | <8 | Δ |
| 8* | 80 | 5 | 0 | ○ | 3.3 | 30 | <8 | Δ |
| 9* | 150 | 5 | 0 | ○ | 3.3 | 30 | <8 | Δ |
| 10* | 200 | 5 | 0 | Δ | 2.6 | 24 | <8 | Δ |
| 11* | 0 | 80 | 0 | ○ | 2.9 | 28 | <8 | Δ |
| 12* | 5 | 80 | 0 | ○ | 3.3 | 30 | <8 | Δ |
| 13* | 80 | 80 | 0 | ○ | 3.3 | 30 | <8 | Δ |
| 14* | 150 | 80 | 0 | ○ | 3.3 | 30 | <8 | Δ |
| 15* | 200 | 80 | 0 | Δ | 2.7 | 24 | <8 | Δ |
| 16* | 0 | 150 | 0 | ○ | 3.1 | 29 | <8 | Δ |
| 17* | 5 | 150 | 0 | ○ | 3.3 | 30 | <8 | Δ |
| 18* | 80 | 150 | 0 | ○ | 3.3 | 30 | <8 | Δ |
| 19* | 150 | 150 | 0 | ○ | 3.3 | 30 | <8 | Δ |
| 20* | 200 | 150 | 0 | Δ | 2.6 | 24 | <8 | Δ |
| 21* | 0 | 200 | 0 | Δ | 2.8 | 28 | <8 | Δ |
| 22* | 5 | 200 | 0 | Δ | 2.6 | 27 | <8 | Δ |
| 23* | 80 | 200 | 0 | Δ | 2.4 | 26 | <8 | Δ |
| 24* | 150 | 200 | 0 | Δ | 2.2 | 24 | <8 | Δ |
| 25* | 200 | 200 | 0 | X | 1.8 | 22 | <8 | X |

TABLE 2

| Sample Number | Elements in ferrite (ppm) | | | Internal conductor | L ($\mu$H) | Q | Initial insulation resistance (LOGIR) | Reliability test |
|---|---|---|---|---|---|---|---|---|
| | S | Cl | Na | | | | | |
| 26* | 0 | 0 | 5 | ○ | 2.9 | 26 | 9 to 10 | ○ |
| 27*. | 5 | 0 | 5 | ○ | 3.1 | 28 | 9 to 10 | ○ |
| 28* | 80 | 0 | 5 | ○ | 3.0 | 29 | 9 to 10 | ○ |
| 29* | 150 | 0 | 5 | ○ | 3.0 | 29 | 9 to 10 | ○ |
| 30* | 200 | 0 | 5 | Δ | 2.6 | 29 | 9 to 10 | Δ |
| 31* | 0 | 5 | 5 | ○ | 3.0 | 28 | 9 to 10 | ○ |
| 32 | 5 | 5 | 5 | ○ | 3.3 | 30 | 9 to 10 | ○ |
| 33 | 80 | 5 | 5 | ○ | 3.3 | 30 | 9 to 10 | ○ |
| 34 | 150 | 5 | 5 | ○ | 3.3 | 30 | 9 to 10 | ○ |
| 35* | 200 | 5 | 5 | Δ | 2.6 | 24 | 9 to 10 | Δ |
| 36* | 0 | 80 | 5 | ○ | 2.9 | 28 | 9 to 10 | ○ |
| 37 | 5 | 80 | 5 | ○ | 3.3 | 30 | 9 to 10 | ○ |
| 38 | 80 | 80 | 5 | ○ | 3.3 | 30 | 9 to 10 | ○ |
| 39 | 150 | 80 | 5 | ○ | 3.3 | 30 | 9 to 10 | ○ |
| 40* | 200 | 80 | 5 | Δ | 2.7 | 24 | 9 to 10 | Δ |
| 41* | 0 | 150 | 5 | ○ | 3.1 | 29 | 9 to 10 | ○ |
| 42 | 5 | 150 | 5 | ○ | 3.3 | 30 | 9 to 10 | ○ |
| 43 | 80 | 150 | 5 | ○ | 3.3 | 30 | 9 to 10 | ○ |
| 44 | 150 | 150 | 5 | ○ | 3.3 | 30 | 9 to 10 | ○ |
| 45* | 200 | 150 | 5 | Δ | 2.6 | 24 | 9 to 10 | Δ |
| 46* | 0 | 200 | 5 | Δ | 2.8 | 28 | 9 to 10 | Δ |
| 47* | 5 | 200 | 5 | Δ | 2.6 | 27 | 9 to 10 | Δ |
| 48* | 80 | 200 | 5 | Δ | 2.4 | 26 | 9 to 10 | Δ |
| 49* | 150 | 200 | 5 | Δ | 2.2 | 24 | 9 to 10 | Δ |
| 50* | 200 | 200 | 5 | X | 1.8 | 22 | 9 to 10 | X |

TABLE 3

| Sample Number | Elements in ferrite (ppm) S | Cl | Na | Internal conductor | L (μH) | Q | Initial insulation resistance (LOGIR) | Reliability test |
|---|---|---|---|---|---|---|---|---|
| 51* | 0 | 0 | 50 | ○ | 2.9 | 26 | 10 to 11 | ○ |
| 52* | 5 | 0 | 50 | ○ | 3.1 | 28 | 10 to 11 | ○ |
| 53* | 80 | 0 | 50 | ○ | 3.0 | 29 | 10 to 11 | ○ |
| 54* | 150 | 0 | 50 | ○ | 3.0 | 29 | 10 to 11 | ○ |
| 55* | 200 | 0 | 50 | Δ | 2.6 | 29 | 10 to 11 | Δ |
| 56* | 0 | 5 | 50 | ○ | 3.0 | 28 | 10 to 11 | ○ |
| 57 | 5 | 5 | 50 | ○ | 3.3 | 30 | 10 to 11 | ○ |
| 58 | 80 | 5 | 50 | ○ | 3.3 | 30 | 10 to 11 | ○ |
| 59 | 150 | 5 | 50 | ○ | 3.3 | 30 | 10 to 11 | ○ |
| 60* | 200 | 5 | 50 | Δ | 2.6 | 24 | 10 to 11 | Δ |
| 61* | 0 | 80 | 50 | ○ | 2.9 | 28 | 10 to 11 | ○ |
| 62 | 5 | 80 | 50 | ○ | 3.3 | 30 | 10 to 11 | ○ |
| 63 | 80 | 80 | 50 | ○ | 3.3 | 30 | 10 to 11 | ○ |
| 64 | 150 | 80 | 50 | ○ | 3.3 | 30 | 10 to 11 | ○ |
| 65* | 200 | 80 | 50 | Δ | 2.7 | 24 | 10 to 11 | Δ |
| 66* | 0 | 150 | 50 | ○ | 3.1 | 29 | 10 to 11 | ○ |
| 67 | 5 | 150 | 50 | ○ | 3.3 | 30 | 10 to 11 | ○ |
| 68 | 80 | 150 | 50 | ○ | 3.3 | 30 | 10 to 11 | ○ |
| 69 | 150 | 150 | 50 | ○ | 3.3 | 30 | 10 to 11 | ○ |
| 70* | 200 | 150 | 50 | Δ | 2.6 | 24 | 10 to 11 | Δ |
| 71* | 0 | 200 | 50 | Δ | 2.8 | 28 | 10 to 11 | Δ |
| 72* | 5 | 200 | 50 | Δ | 2.6 | 27 | 10 to 11 | Δ |
| 73* | 80 | 200 | 50 | Δ | 2.4 | 26 | 10 to 11 | Δ |
| 74* | 150 | 200 | 50 | Δ | 2.2 | 24 | 10 to 11 | Δ |
| 75* | 200 | 200 | 50 | X | 1.8 | 22 | 10 to 11 | X |

TABLE 4

| Sample Number | Elements in ferrite (ppm) S | Cl | Na | Internal conductor | L (μH) | Q | Initial insulation resistance (LOGIR) | Reliability test |
|---|---|---|---|---|---|---|---|---|
| 76* | 0 | 0 | 100 | ○ | 2.9 | 26 | 10 to 11 | ○ |
| 77* | 5 | 0 | 100 | ○ | 3.1 | 28 | 10 to 11 | ○ |
| 78* | 80 | 0 | 100 | ○ | 3.1 | 29 | 10 to 11 | ○ |
| 79* | 150 | 0 | 100 | ○ | 3.1 | 29 | 10 to 11 | ○ |
| 80* | 200 | 0 | 100 | Δ | 2.7 | 29 | 10 to 11 | Δ |
| 81* | 0 | 5 | 100 | ○ | 3.0 | 28 | 10 to 11 | ○ |
| 82 | 5 | 5 | 100 | ○ | 3.3 | 30 | 10 to 11 | ○ |
| 83 | 80 | 5 | 100 | ○ | 3.4 | 30 | 10 to 11 | ○ |
| 84 | 150 | 5 | 100 | ○ | 3.3 | 30 | 10 to 11 | ○ |
| 85* | 200 | 5 | 100 | Δ | 2.6 | 24 | 10 to 11 | Δ |
| 86* | 0 | 80 | 100 | ○ | 2.9 | 28 | 10 to 11 | ○ |
| 87 | 5 | 80 | 100 | ○ | 3.3 | 30 | 10 to 11 | ○ |
| 88 | 80 | 80 | 100 | ○ | 3.3 | 31 | 10 to 11 | ○ |
| 89 | 150 | 80 | 100 | ○ | 3.3 | 30 | 10 to 11 | ○ |
| 90* | 200 | 80 | 100 | Δ | 2.7 | 24 | 10 to 11 | Δ |
| 91* | 0 | 150 | 100 | ○ | 3.1 | 29 | 10 to 11 | ○ |
| 92 | 5 | 150 | 100 | ○ | 3.3 | 30 | 10 to 11 | ○ |
| 93 | 80 | 150 | 100 | ○ | 3.3 | 30 | 10 to 11 | ○ |
| 94 | 150 | 150 | 100 | ○ | 3.4 | 31 | 10 to 11 | ○ |
| 95* | 200 | 150 | 100 | Δ | 2.6 | 24 | 10 to 11 | Δ |
| 96* | 0 | 200 | 100 | Δ | 2.8 | 28 | 10 to 11 | Δ |
| 97* | 5 | 200 | 100 | Δ | 2.6 | 27 | 10 to 11 | Δ |
| 98* | 80 | 200 | 100 | Δ | 2.4 | 26 | 10 to 11 | Δ |
| 99* | 150 | 200 | 100 | Δ | 2.2 | 24 | 10 to 11 | Δ |
| 100* | 200 | 200 | 100 | X | 1.8 | 22 | 10 to 11 | X |

TABLE 5

| Sample Number | Elements in ferrite (ppm) S | Cl | Na | Internal conductor | L (μH) | Q | Initial insulation resistance (LOGIR) | Reliability test |
|---|---|---|---|---|---|---|---|---|
| 101* | 0 | 0 | 150 | ○ | 2.9 | 26 | 10 to 11 | X |
| 102* | 5 | 0 | 150 | ○ | 3.1 | 28 | 10 to 11 | X |
| 103* | 80 | 0 | 150 | ○ | 3.2 | 29 | 10 to 11 | X |

TABLE 5-continued

| Sample Number | Elements in ferrite (ppm) | | | Internal conductor | L ($\mu$H) | Q | Initial insulation resistance (LOGIR) | Reliability test |
|---|---|---|---|---|---|---|---|---|
| | S | Cl | Na | | | | | |
| 104* | 150 | 0 | 150 | ○ | 3.0 | 30 | 10 to 11 | X |
| 105* | 200 | 0 | 150 | Δ | 2.6 | 29 | 10 to 11 | X |
| 106* | 0 | 5 | 150 | ○ | 3.0 | 28 | 10 to 11 | X |
| 107* | 5 | 5 | 150 | ○ | 3.4 | 30 | 10 to 11 | X |
| 108* | 80 | 5 | 150 | ○ | 3.4 | 30 | 10 to 11 | X |
| 109* | 150 | 5 | 150 | ○ | 3.3 | 30 | 10 to 11 | X |
| 110* | 200 | 5 | 150 | Δ | 2.6 | 24 | 10 to 11 | X |
| 111* | 0 | 80 | 150 | ○ | 2.9 | 28 | 10 to 11 | X |
| 112* | 5 | 80 | 150 | ○ | 3.3 | 30 | 10 to 11 | X |
| 113* | 80 | 80 | 150 | ○ | 3.3 | 30 | 10 to 11 | X |
| 114* | 150 | 80 | 150 | ○ | 3.4 | 30 | 10 to 11 | X |
| 115* | 200 | 80 | 150 | Δ | 2.7 | 24 | 10 to 11 | X |
| 116* | 0 | 150 | 150 | ○ | 3.1 | 29 | 10 to 11 | X |
| 117* | 5 | 150 | 150 | ○ | 3.3 | 30 | 10 to 11 | X |
| 118* | 80 | 150 | 150 | ○ | 3.5 | 32 | 10 to 11 | X |
| 119* | 150 | 150 | 150 | ○ | 3.3 | 30 | 10 to 11 | X |
| 120* | 200 | 150 | 150 | Δ | 2.6 | 24 | 10 to 11 | X |
| 121* | 0 | 200 | 150 | Δ | 2.8 | 28 | 10 to 11 | X |
| 122* | 5 | 200 | 150 | Δ | 2.6 | 27 | 10 to 11 | X |
| 123* | 80 | 200 | 150 | Δ | 2.4 | 26 | 10 to 11 | X |
| 124* | 150 | 200 | 150 | Δ | 2.2 | 24 | 10 to 11 | X |
| 125* | 200 | 200 | 150 | X | 1.8 | 22 | 10 to 11 | X |

In Tables 1 to 5, the mark ○ in the column of the internal conductor indicates that a decrease in the metal component contained in the internal electrode was not observed, the mark Δ indicates that a decrease in the metal component contained in the internal electrode of 10% or less was observed, and the mark × indicates that a decrease in the metal component contained in the internal electrode of 50% or greater was observed.

In Tables 1 to 5, the mark ○ provided in the column of the reliability test indicates that deterioration of the insulation resistance was not observed in the test lasting for 2,000 hours, the mark Δ indicates that the log(IR) decreased to 8 in the test lasting for 2,000 hours, and the mark × indicates that the log(IR) was decreased to less than 8 in the test lasting for 2,000 hours.

In Tables 1 to 5, concerning the samples in which the contents of S, Cl and Na were out of the ranges of the present invention (ceramic inductor components having sample numbers marked with asterisks, in which the content of S was out of the range of about 5 to 150 ppm, the content of Cl was out of the range of about 5 to 150 ppm, and the content of Na was out of the range of about 5 to 100 ppm), phenomena were observed in which satisfactory electric properties were not always obtained, the initial insulation resistances were low, and the insulation resistances in the reliability test were decreased.

In contrast, concerning the samples in which the contents of S, Cl and Na were in the ranges of the present invention (ceramic inductor components having sample numbers marked with no asterisk, in which the content of S was about 5 to 150 ppm, the content of Cl was about 5 to 150 ppm, and the content of Na was about 5 to 100 ppm), it was confirmed that satisfactory electric properties were obtained, the initial insulation resistances were high, and the insulation resistances in the reliability test were not decreased.

As described above, according to the present invention, a highly reliable ceramic inductor component having high qualities and longer life can be provided in which the proportion of defective products is low in manufacturing.

When the sintered densities of magnetic ceramic bodies were compared between ceramic inductor components of the comparative example of sample number 35 in Table 2 and of the example of sample number 37 according to the present invention in Table 2, the sintered density of the comparative example, which was outside of the present invention, was 5.1 g/cm$^3$, and in contrast, it was confirmed that the sintered density of the example of the present invention was improved to 5.2 g/cm$^3$.

The external electrodes of the samples of the comparative example and the example, the sintered densities of which were compared with each other as described above, were plated, and the rates of occurrence of plating defects were measured. In the sample of the comparative example, the rates of occurrence of plating defects was 5%, and in contrast, in the sample of the example, plating defects were not observed. In the present invention, a plating defect is an abnormal growth of the plating layer toward the surface of the element in a step of plating Sn or solder on external electrodes in order to improve plating properties thereof.

In the examples described above, the laminated ceramic inductor component having the internal conductor (coil) disposed in the magnetic ceramic body was described; however, the present invention is not limited to the laminated types, and the present invention can be applied to, for example, a ceramic inductor component provided with a coiled conductor on a core by baking a conductive material disposed on the core formed of a magnetic ceramic body.

Figure 2:
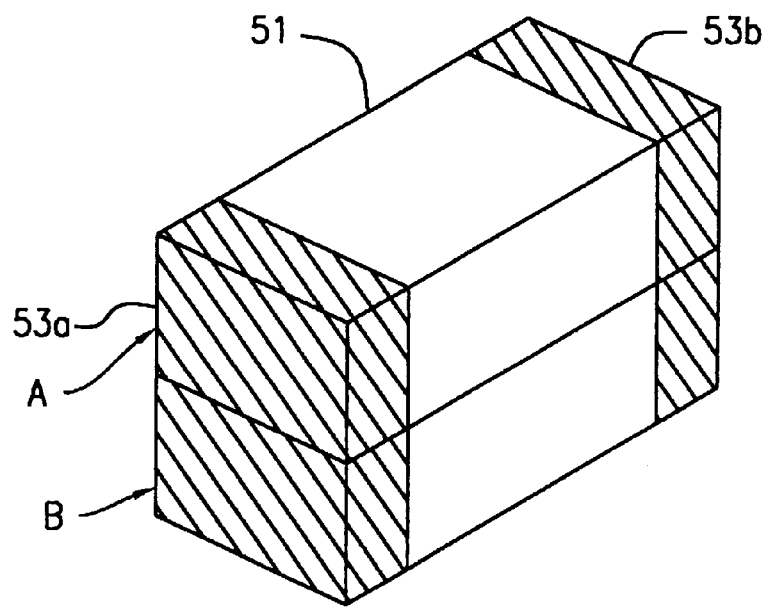
FIG. 2 is a perspective view showing an external structure of a composite component according to an example of the present invention.

In the examples described above, the ceramic inductor component was described as an example; however, the present invention can be applied to a composite component composed of an inductor portion A and a capacitor portion B, as shown in FIG. 2. In the case mentioned above, advantages equivalent to those in the examples described above can be obtained.

Figure 1B:
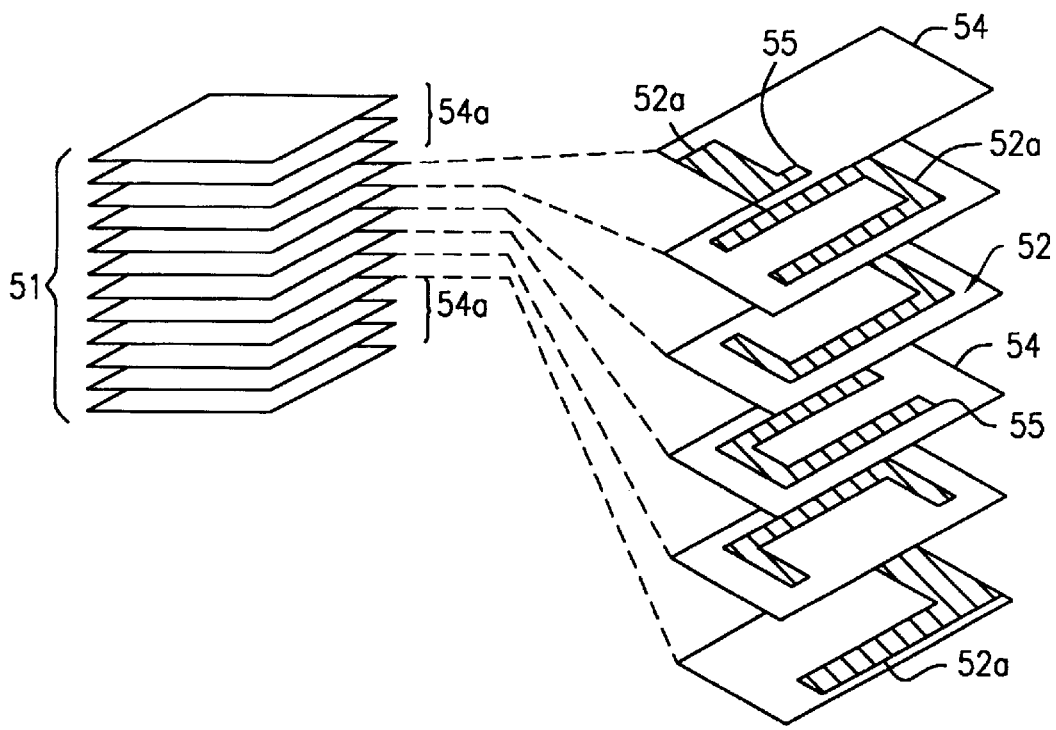
FIG. 1B is an exploded perspective view showing an internal structure of a ceramic inductor component according to an example of the present invention.
Figure 3:
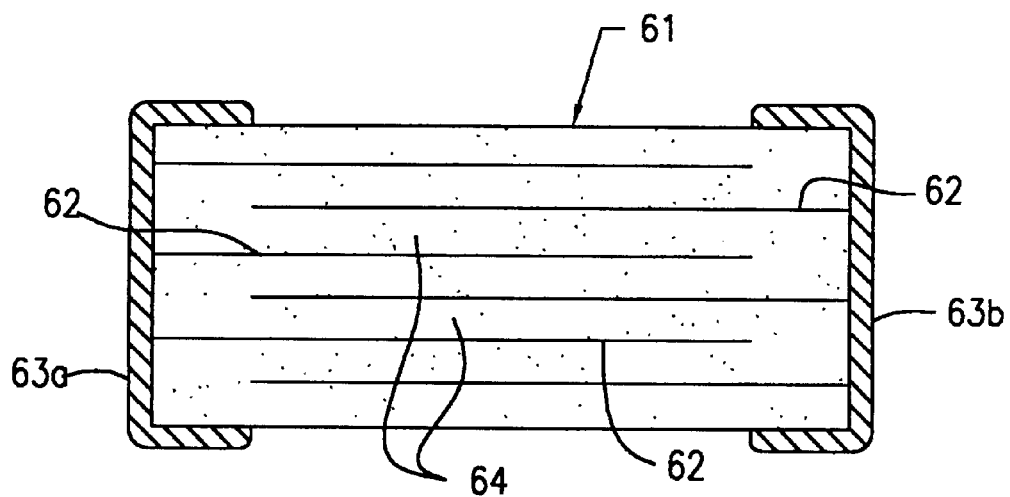
FIG. 3 is a cross-sectional view showing an internal structure of a capacitor segment constituting a composite component according to an example of the present invention.

In addition, in the case described above, an inductor having a structure as shown in FIGS. 1A and 1B can be used as the inductor portion A, and as the capacitor portion B, for example, a laminated ceramic capacitor can be used in which, as shown in FIG. 3, internal electrodes 62 are disposed so as to oppose each other in a capacitor element (ceramic element) 61 with dielectric ceramic layers 64 provided therebetween, and external electrodes 63a and 63b are disposed at both ends of the ceramic element 61 so as to be connected with the internal electrodes 62 which alternately extend to the different edge surfaces. In addition, other structures may be further used as a capacitor segment.

Furthermore, the present invention can be applied to a composite component comprising an element other than a capacitor segment.

The present invention is not limited to the embodiments and the examples described above, and concerning compositions of ferrite, shapes and arrangement of electrodes, particular contents of S, Cl and Na, production methods, and the like, various application and modification thereof can be made within the scope of the present invention.

As has thus been described, since the ceramic inductor component of the present invention uses the magnetic ceramic body comprising Ni—Cu—Zn ferrite or Ni—Cu ferrite, and the contents of S, Cl and Na contained in the ferrite are controlled to be about 5 to 150 ppm, about 5 to 150 ppm, and about 5 to 100 ppm, respectively, a highly reliable ceramic inductor component can be obtained which is reliably provided with necessary properties and has superior stability.

That is, according to the present invention, the advantages which can be obtained are (A) degradation of electric properties can be avoided by suppressing the diffusion of internal conductive metal primarily composed of Ag into the magnetic ceramic body, (B) by facilitating sintering, in addition to improvement in insulation resistance of the ceramic, the operating reliability can be maintained over long periods of time, and by virtue of the effects of (A) and (B), (C) abnormal growth of the plating layer toward the surface of the element can be avoided, which would usually occur in a step of plating Sn or solder on external electrodes in order to improve soldering properties of the external electrodes.

In the ceramic inductor of the present invention, since the contents of S, Cl and Na contained in the ferrite before baking, i.e., starting materials for the ferrite, are controlled to be about 10 to 600 ppm S, about 10 to 600 ppm Cl, and about 30 to 120 ppm Na, even if S, Cl and Na are evaporated to some extent in baking, S, Cl and Na in the ferrite contained in the magnetic ceramic body after baking can be controlled in the ranges of about 5 to 150 ppm, about 5 to 150 ppm, and about 5 to 100 ppm, respectively, when baking thereof is performed under typical conditions. Consequently, a highly reliable ceramic inductor component can be obtained which is reliably provided with necessary properties and superior stability. As a result, the present invention can be effectively carried out.

In the present invention, the structure of the electrode (conductor material) is not specifically limited. However, when the present invention is applied to a ceramic inductor component using a laminated coil, as an inductor portion, formed of magnetic ceramic layers and electrode layers laminated therewith, it is particularly effective, since improvements can be realized in the stability of properties and reliability of a ceramic inductor component (laminated inductor) which is compact and which can yield a large inductance.

The present invention can also be applied to a composite component having an inductor portion integrated with at least one other element, and in the case mentioned above, advantages can be obtained which are equivalent to those of the ceramic inductor components described above.

What is claimed is:

1. A ceramic inductor component comprising:
    a baked inductor portion comprising a magnetic ceramic body and an integral electrode comprising silver;
    wherein the magnetic ceramic body comprises a Ni and Cu ferrite which also contains sulfur, chlorine and sodium; and
    wherein the content of sulfur; chlorine and sodium in the ferrite are in the ranges of about 5 to 150 ppm sulfur, about 5 to 150 ppm chlorine and about 5 to 100 ppm sodium.

2. A ceramic inductor component according to claim 1, wherein the ferrite is a Ni—Cu-Zinc ferrite or Ni—Cu ferrite.

3. A ceramic inductor component according to claim 2, wherein the inductor portion comprises a laminated coil in a magnetic ceramic body, the laminated coil comprising a plurality of interconnected layers of electrode with a layer of magnetic ceramic between adjacent layers of electrode.

4. A ceramic inductor component according to claim 3, wherein another electrical element is integrated with the inductor portion.

5. A ceramic inductor component according to claim 4, wherein the other electrical element is a capacitor.

6. A ceramic inductor component according to claim 1, wherein the inductor portion comprises a laminated coil in a magnetic ceramic body, the laminated coil comprising a plurality of interconnected layers of electrode with a layer of magnetic ceramic between adjacent layers of electrode.

7. A ceramic inductor component according to claim 6, wherein another electrical element is integrated with the inductor portion.

8. A ceramic inductor component according to claim 7, wherein the other electrical element is a capacitor.

9. A ceramic inductor component according to claim 1, wherein another electrical element is integrated with the inductor portion.

10. A ceramic inductor component according to claim 9, wherein the other electrical element is a capacitor.

11. A ceramic inductor component comprising:
    an unbaked inductor portion comprising a magnetic ceramic body and an integral electrode comprising silver;
    wherein the magnetic ceramic body comprises a Ni and Cu ferrite which also contains sulfur, chlorine and sodium; and
    wherein the content of sulfur, chlorine and sodium in the ferrite are in the ranges of about 10 to 600 ppm sulfur, about 10 to 600 ppm chlorine and about 30 to 120 ppm sodium.

12. A ceramic inductor component according to claim 11, wherein the ferrite is a Ni—Cu-Zinc ferrite or Ni—Cu ferrite.

13. A ceramic inductor component according to claim 12, wherein the inductor portion comprises a laminated coil in a magnetic ceramic body, the laminated coil comprising a plurality of interconnected layers of electrode with a layer of magnetic ceramic between adjacent layers of electrode.

14. A ceramic inductor component according to claim 13, wherein another electrical element is integrated with the inductor portion.

15. A ceramic inductor component according to claim 14, wherein the other electrical element is a capacitor.

16. A ceramic inductor component according to claim 11, wherein the inductor portion comprises a laminated coil in a magnetic ceramic body, the laminated coil comprising a plurality of interconnected layers of electrode with a layer of magnetic ceramic between adjacent layers of electrode.

17. A ceramic inductor component according to claim 16, wherein another electrical element is integrated with the inductor portion.

18. A ceramic inductor component according to claim 17, wherein the other electrical element is a capacitor.

19. A ceramic inductor component according to claim 11, wherein another electrical element is integrated with the inductor portion.

20. A ceramic inductor component according to claim 19, wherein the other electrical element is a capacitor.

* * * * *